Aug. 17, 1954  E. K. RALSTON  2,686,508
VALVE ROTATING DEVICE

Filed March 4, 1952 2 Sheets-Sheet 1

Inventor
Eldon K. Ralston
by Hill, Sherman, Meroni, Gross & Simpson Attys

Aug. 17, 1954     E. K. RALSTON     2,686,508
VALVE ROTATING DEVICE
Filed March 4, 1952     2 Sheets-Sheet 2
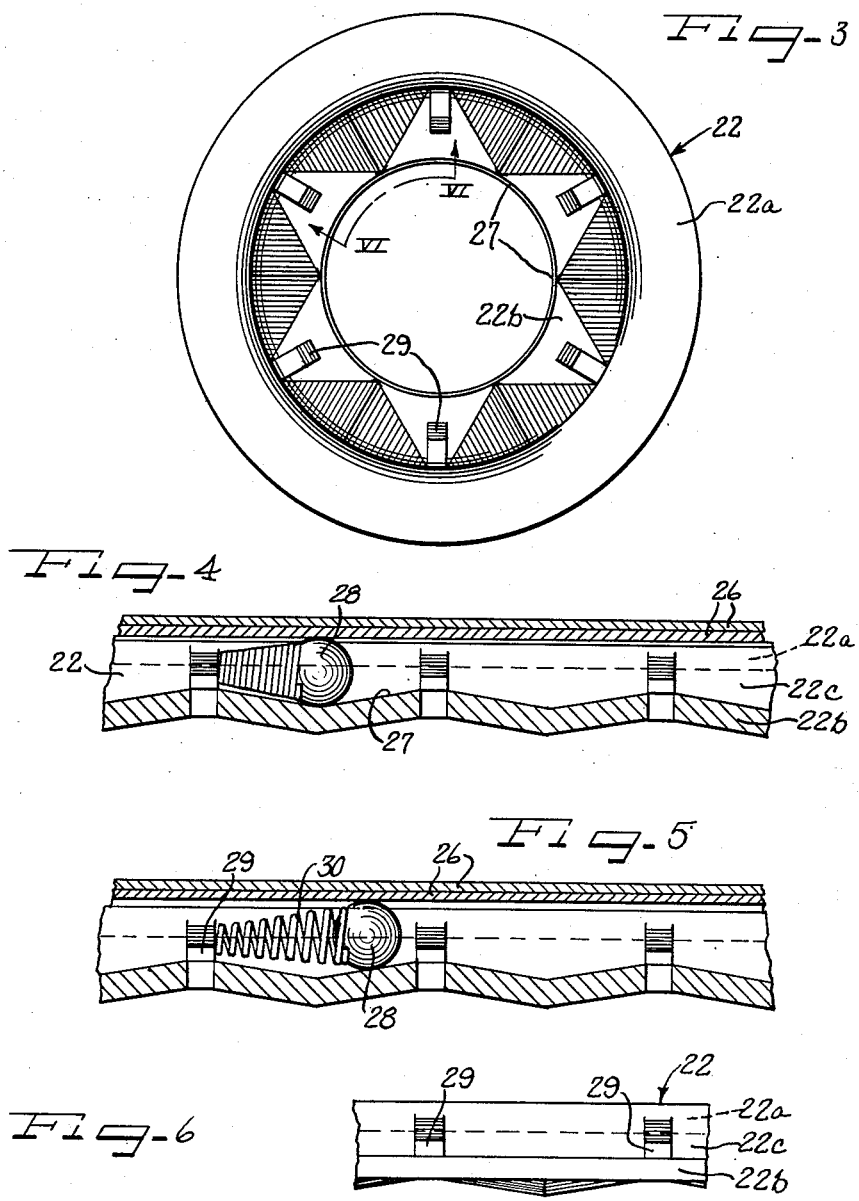
Inventor
Eldon K. Ralston Patented Aug. 17, 1954

2,686,508

UNITED STATES PATENT OFFICE 2,686,508

VALVE ROTATING DEVICE

Eldon K. Ralston, Lyndhurst, Ohio, assignor to Thompson Products, Inc., Cleveland, Ohio, a corporation of Ohio Application March 4, 1952, Serial No. 274,730

16 Claims. (Cl. 123—90)

This invention relates to a valve rotation device and more particularly to a compact, efficient, economically manufacturable and readily installed device for rotating poppet valves each time the valve heads are raised from their seats.

While the invention will hereinafter be described in connection with devices for rotating poppet valves, it should be understood that the devices of this invention are not limited to any particular usage since they are capable of imparting rotating movements to any rotatable member and especially spring loaded rotatable members.

According to this invention, the conventional spring retainer of a spring pressed poppet valve is replaced with an assembly including a collar arranged to seat on one end of a conventional helical compression spring, a retainer cap arranged to be secured to the steam of a poppet valve, a resilient spring washer interposed between the collar and the retainer. The collar has circumferentially spaced cam surfaces and a plurality of balls each engage one of the cam surfaces and the spring washer. As the valve is moved axially against the compression of the spring, the resilient washer will deflect to transfer the spring load from the collar to the balls whereupon the balls will ride on the cam surfaces and effect rotation of the resilient washer and retainer cap. When the valve is moved in a reverse axial direction by the compression spring, the load will be transferred back to the collar and the balls are permitted to return to their initial position.

The rotation of poppet valves during operation of internal combustion engines keeps the valve seat and the valve stem free of carbon and the like substances and promotes very even wear.

According to a specific feature of this invention, the collar includes an outer portion arranged to seat against one end of the spring and an inner portion extending within the spring which is provided with the circumferentially spaced cam surfaces. The outer and inner portions are connected by an axially extending intermediate portion which may preferably tightly engage inside the spring. This feature permits a very compact assembly since the cam surfaces are within the spring and the collar need not have a diameter any greater than the outside diameter of the spring. Further, since there are no overhanging parts of the collar, it may be a one-piece stamped sheet metal member which is very readily and economically manufacturable.

According to a further feature, the balls which ride on the cam surfaces of the collar may be spring pressed circumferentially by a compression spring. For this purpose, the collar herein has integral struck-out projections intermediate the cam surfaces which engage the spring and limit circumferential movement of the balls.

In accordance with a still further feature, the retainer cap may be a readily and economically manufacturable stamped sheet metal piece.

Still another feature of this invention is in the provision of a spring washer having critical dimensions with respect to the forces of the compression spring in the closed an opened positions of the valve to insure efficient and reliable operation and to minimize wear on the parts.

An object of this invention, accordingly, is to provide a valve rotating device which is compact, efficent, economically manufacturable and readily installed.

Another object of this invention is to provide a valve rotating device including a collar arranged to seat on a helical compression spring in a compact manner.

A further object of this invention is to provide a valve rotating device including parts which may be readily and economically stamped from sheet metal.

A still further object of this invention is to provide an improved valve rotating device including a spring washer having critical dimensions insuring efficient and reliable operation with minimum wear on the parts.

This invention contemplates other objects, features and advantages which will become more fully apparent from the following detailed description taken in conjunction with the accompanying drawings which illustrate a preferred embodiment and in which:

Figure 3 is a plan view of the collar shown in Figures 1 and 2;

Figure 4 is a sectional view looking outwardly from a vertical arcuate plane through the balls with the parts in the positions illustrated in Figure 2;

Figure 5 is a cross-sectional view similar to Figure 4 but with the parts in the position illustrated in Figure 1; and Figure 6 is a view looking along lines VI—VI of Figure 3.

As shown on the drawings:

Figure 1:
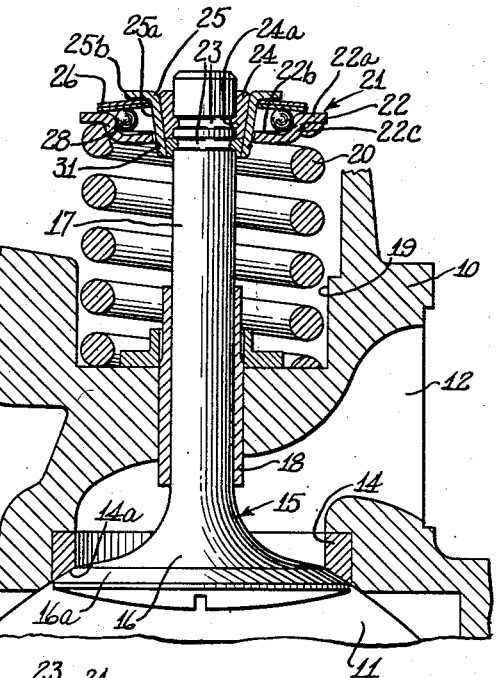
Figure 1 is a vertical cross-sectional view, with parts in elevation, of a poppet valve assembly equipped with a valve-rotating device according to this invention.
Figure 2:
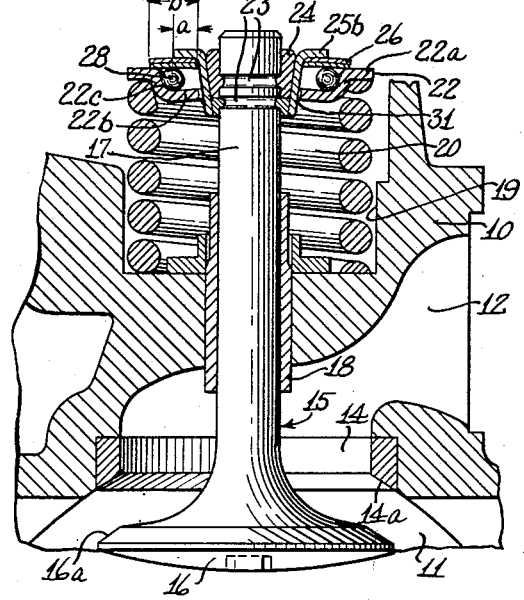
Figure 2 is a view similar to Figure 1, but illustrating the positions of the parts when the valve is opened.

In Figures 1 and 2, reference numeral 10 designates an engine part such as, for example, a portion of the cylinder head of an internal combustion engine. The engine part 10 defines a combustion chamber 11 and a port 12. A seat ring 14 is secured in the mouth of the port 12 and has a beveled seating face 14a facing the combustion chamber 11. A poppet valve 15 has a head portion 16 provided with a beveled seating face 16a coacting with the seat 14a of the ring 14. The valve 15 has a stem 17 slidably mounted in a stem guide sleeve 18 carried by the engine part 10. The stem guide sleeve 18 projects from the port 12 through a wall of the engine part 10 into a recess 19 in the engine part 10. A helical compression spring 20 is seated on the bottom of the recess 19. The other end of the spring 20 is connected to the valve stem 17 through a rotating device generally designated by reference numeral 21 constructed according to this invention, the spring 20 urging the stem axially to close the valve.

The device 21 is arranged to rotate the valve incrementally as the valve is reciprocably moved between open and closed positions. The device 21 includes a collar 22 having an outer portion 22a arranged to seat against the end of the spring 20, an inner portion 22b disposed within the spring 20 and an intermediate axially extending portion 22c connecting the outer portion 22a and inner portion 22b and preferably tightly engaging inside the spring 20.

The valve stem 17 has conventional retainer lock grooves 23 near the tip end thereof which coact with beads 24a of a retainer lock 24. A retainer cap 25 has a central tapered collar portion 25a receiving the retainer lock 24 and coacting therewith to secure the cap on the valve stem 17. The retainer cap 25 also has a outwardly projecting annular flange portion 25b facing the collar 22.

Interposed between the collar 22 and the retainer cap 25 is one or more annular spring washers 26 which provide an outer edge engageable with the outer portion 22a of the collar 22 and an inner edge engaging the flange portion 25b of the retainer cap 25.

To effect relative rotation of the retainer cap 25 with respect to the collar 22, the inner portion 22b of the collar 22 has a plurality of circumferentially spaced cam surfaces thereon as designated by reference numeral 27, Figures 3–5, and means such as balls 28 engage the cam surfaces 27 and the spring washer 26.

With the parts in the position illustrated in Figure 1, i. e. with the valve closed, the load of the spring 20 is carried by the spring washers 26 through the outer portion 22a of the collar 22. The balls 28 may then be moved circumferentially on the cam surfaces 27 toward the spring washer 26 so as to wedge therebetween as illustrated in Figure 5. For so moving the balls 28, the collar may have integral struck-out projections 29 between the cam surfaces 27 and a compression spring 30 may be disposed between each projection 29 and one of the balls 28. It may be here noted that the projections 29 as well as providing a seat for the spring 30, also limit the circumferential movement of the balls 28.

When the stem 17 is moved axially from the position of Figure 1 to the position of Figure 2, i. e. when the valve is open, the spring washers 26 will be deflected or bowed to transfer the load from the outer portion 22a of the collar 22 to the balls 28. The balls 28 will then ride on the cam surfaces 27 to rotate the spring washers 26, the retainer cap 25 and the stem 17, of course, rotating with the spring washers 26.

When the valve stem 17 is then moved from the position of Figure 2 to the position of Figure 1, i. e. when the valve is closed, the load of the spring 20 will be transferred immediately to the stem 17 through the outer portion 22a of the collar 22, the spring washers 26 and the retainer cap 25. The balls 28 will then be free to move circumferentially from a position as illustrated in Figure 4 to a position as illustrated in Figure 5. It will thus be apparent that the valve 15 is positively rotated upon each reciprocable axle movement thereof. This, of course, keeps the valve seat free from carbon and the like and promotes even wear thereof.

If desired, the retainer cap 25, the washers 26, the balls 28, the spring 30 and the collar 22 may be held in assembly by means of a retainer ring 31 disposed on the collar portion 25a of the retainer cap 25 so as to be engageable with the inner portion 22b of the collar 22. Thus, the rotating device 21 may be readily installed in place of the conventional spring retainer of a spring pressed poppet valve. It will be noted that the outer diameter of the collar 22 need be no greater than the outer diameter of the spring 20 so that the device is very compact. Further, the axial extent of the device is minimized.

Among other advantages of the construction thus far described is the fact that the collar 22 including the projections 29 may be readily formed from sheet metal in a single stamping operation. The retainer cap 25 may also be stamped from sheet metal or other sheet material in a single operation. Thus, the valve rotating device may be manufactured with a minimum of cost.

Another feature of this invention resides in forming the spring washer (or washers) 26 with particular dimensions with respect to the loads of the spring 20 in the closed and open positions of the valve 15. Although the device may operate satisfactorily with other dimensions, it has been found that greatly improved results are obtained when the ratio of the radial distance between the inner edge of the washer 26 and the points of engagement of the balls 28 therewith (distance $a$ in Figure 2) to the radial extent of the washer between the inner and outer edges thereof (distance $b$ in Figure 2) is at least as great as the ratio of the force supplied by compression spring 20 when the valve is closed to the force applied by the spring 20 when the valve is open.

With this relation, the outer edge of the washer is completely lifted off the outer portion 22a of the collar 22 when the valve is open, thus insuring free and positive rotation of the valve stem without undue friction between the collar 22 and the washer 26 or scuffing of the balls 28 out of round. If the ratio of $a$ to $b$ is less than the minimum expressed above, there will be a great deal of friction between the collar 22 and the washer 26 and at the balls 28, even though the device may operate.

It will be apparent that modifications and variations may be effected without departing from the spirit and scope of the novel concepts of the present invention.

I claim as my invention:

1. In a valve assembly including an engine part having a bore and a valve seat aligned with the bore, a stem slidable in the bore, a head on said stem coacting with said seat, and a helical compression spring around a portion of said stem with one end thereof seated against the engine part, a device for rotating the stem upon reciprocable axial movement thereof, comprising: a stamped sheet metal collar having an outer portion seated on the opposite end of the spring and an inner portion extending within the spring with an intermediate annular portion connecting said inner and outer portions and tightly engaging inside the spring, said inner portion being deformed adjacent said intermediate portion to provide circumferentially spaced cam surfaces and having integral struck-out projections intermediate said cam surfaces, a spring washer having an outer edge portion engageable with said outer portion of said collar, a plurality of balls each engaging between said spring washer and one of said cam surfaces, a compression spring interposed between each of said balls and one of said integral struck-out projections, and a stamped sheet metal retainer cap locked on the stem and having an integral annular flange engaging said spring washer.

2. In an assembly including a member having a bore, a shaft slidable in the bore and a compression spring urging said shaft in one direction to a first axial position, the shaft being actuatable against the action of the spring in the opposite direction to a second axial position, a device interposed with said spring between the member and the shaft for rotating the shaft upon reciprocable movement thereof between said first and second positions, comprising: a collar having an outer portion seated on the spring and an inner portion extending within the spring, a retainer cap secured to the shaft, an annular resilient washer disposed between said collar and said cap and having an outer edge engageable with said outer portion of said collar and having an inner edge engaged with said cap, said inner portion of said collar being provided with circumferentially spaced cam surfaces, and a plurality of balls each engaging an intermediate point on said resilient washer and one of said cam surfaces and urged toward the ends of the cam surfaces closest to said washer, the ratio of the radial distance between said inner edge of said washer and said points to the radial distance between said inner and outer edges of said washer being at least as great as the ratio of the force applied by the compression spring in said first axial position of the shaft to the force applied by the compression spring in said second axial position of the shaft.

3. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a collar having an outer portion arranged to seat against one end of the spring and having an inner portion for extending within the spring, said inner portion having circumferentially spaced cam surfaces, a spring washer having an outer edge portion engageable with said outer portion of said collar, and means engaging between said spring washer and said cam surfaces for effecting relative rotation of said washer and said collar and rotation of the shaft upon axial movement thereof against the action of the spring.

4. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a collar having an outer portion arranged to seat against one end of the spring and having an inner portion for extending within the spring together with an axially extending annular portion connecting said inner and outer portions and arranged to tightly engage inside the spring, said inner portion having circumferentially spaced cam surfaces, a spring washer having an outer edge portion engageable with said outer portion of said collar, and means engaging between said spring washer and said cam surfaces for effecting relative rotation of said washer and said collar and rotation of the shaft upon axial movement thereof against the action of the spring.

5. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a collar having an outer portion arranged to seat against one end of the spring and having an inner portion for extending within the spring, said inner portion having circumferentially spaced cam surfaces, a spring washer having an outer edge portion engageable with said outer portion of said collar, and balls engaging between said spring washer and said cam surfaces and urged toward the ends of the cam surfaces closest to said washer for effecting relative rotation of said washer and said collar and rotation of the shaft upon axial movement thereof against the action of the spring.

6. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a collar having an outer portion arranged to seat against one end of the spring and having an inner portion for extending within the spring together with an axially extending annular portion connecting said inner and outer portions and arranged to tightly engage inside the spring, said inner portion having circumferentially spaced cam surfaces, a spring washer having an outer edge portion engageable with said outer portion of said collar, and balls engaging between said spring washer and said cam surfaces and urged toward the ends of the cam surfaces closest to said washer for effecting relative rotation of said washer and said collar and rotation of the shaft upon axial movement thereof against the action of the spring.

7. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a collar having an outer portion arranged to seat against one end of the spring and having an inner portion for extending within the spring, said inner portion having circumferentially spaced cam surfaces and integral struck-out projections intermediate said cam surfaces, a spring washer having an outer edge portion engageable with said outer portion of said collar, a plurality of balls each engaging between said spring washer and one of said cam surfaces, and a compression spring interposed between each of said balls and one of said integral struck-out projections of said collar to urge said balls circumferentially with respect to said cam surfaces.

8. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a stamped sheet metal collar having an outer portion arranged to seat against one end of the spring and having an inner portion for extending within the spring, said inner portion having circumferentially spaced cam surfaces, a spring washer having an outer edge portion engageable with said outer portion of said collar and means engaging between said spring washer and said cam surfaces for effecting relative rotation of said washer and said collar and rotation of the shaft upon axial movement thereof against the action of the spring.

9. A device for use with an assembly including a member having a bore, a shaft slidable in the bore and a helical compression spring for resiliently urging the shaft in an axial direction, said device being arranged to be interposed together with the spring between the shaft and the member for incrementally rotating the shaft upon reciprocable axial movement thereof and comprising: a stamped sheet metal collar having an outer portion arranged to seat against one end of the spring and having an inner portion for extending within the spring, said inner portion having circumferentially spaced cam surfaces and integral struck-out projections intermediate said cam surfaces, a spring washer having an outer edge portion engageable with said outer portion of said collar, a plurality of balls each engaging between said spring washer and one of said cam surfaces, and a compression spring interposed between each of said balls and one of said integral struck-out projections of said collar to urge said balls circumferentially with respect to said cam surfaces.

10. A valve rotating unit of the type adapted to be interposed between a valve spring and a valve stem of a spring loaded poppet valve, comprising, a ring-like collar having an outer peripheral portion adapted to seat a valve spring and an inner portion shaped to provide a plurality of circumferentially spaced raceways, said collar having a plurality of integral struck-out circumferentially spaced ears, there being one ear between each pair of said raceways, a ball in each raceway, a spring bottomed against each ear and biasing a corresponding ball towards the shallow end of a corresponding raceway, a spring washer of lesser diameter than said collar having its outer edge normally engaging said outer peripheral portion of said collar, a retainer adapted to be secured to a valve stem, said retainer having a generally tubular portion extending through said collar and a flange at one end of smaller diameter than said spring washer but seating the inner edge thereof, whereby normal spring loads are transmitted through said spring washer to the valve stem, and means on said retainer confining said collar and said retainer against relative axial separation, said inner portion of said collar being offset from said outer peripheral portion to provide an annular shoulder cooperating with said tubular portion of said retainer to confine said balls in said raceways, said spring washer being deflectable over said balls in response to increased loading to rotate said collar relative to said retainer.

11. A valve rotating device comprising a ring-like collar member having an outer flange adapted to seat a valve spring and an inner flange, said inner flange having formed therein a plurality of inclined circumferentially spaced raceways, a shiftable member in each raceway, a spring washer having an outer rim normally engaging said outer flange and an inner rim, and a retainer adapted to be connected to a valve stem and having a generally tubular portion extending through said inner flange, said retainer having a flange at one end seating said inner rim of said spring washer, said spring washer transmitting normal spring load from said collar member to said retainer, but bowing over said shiftable members to transfer increased spring load to said shiftable members, thereby to rotatably drive said retainer relative to said collar member, and each of said shiftable members being urged toward the end of the associated raceway closest to said spring washer.

12. A valve rotating device comprising a ring-like collar member having an outer flange adapted to seat a valve spring and an inner flange, said inner flange having formed therein a plurality of inclined circumferentially spaced raceways, a shiftable member in each raceway, a spring washer having an outer rim normally engaging said outer flange and an inner rim, and a retainer adapted to be connected to a valve stem and having a generally tubular portion extending through said inner flange, said retainer having a flange at one end seating said inner rim of said spring washer, said spring washer transmitting normal spring load from said collar member to said retainer, but bowing over said shiftable members to transfer increased spring load to said shiftable members, thereby to rotatably drive said retainer relative to said collar member, each of said shiftable members being urged toward the end of the associated raceway closest to said spring washer, and the ratio of the radial distance from the inner rim of said spring washer to the points of contact of said spring washer with said shiftable elements to the radial width of said spring washer being at least as great as the ratio of the expected normal spring load to the expected increased spring load.

13. A valve rotating device comprising a ring-like collar member having an outer flange adapted to seat a valve spring and an inner flange having formed therein a plurality of inclined circumferentially spaced raceways, a ball in each raceway, means in each raceway biasing said ball towards the shallow end of the raceway, a spring washer having an outer peripheral edge normally engaging said outer flange and an inner annular edge, and a retainer adapted to be connected to a valve stem engaging said inner edge of said spring washer, said spring washer transmitting normal spring load from said collar member to said retainer with the valve stem in closed position, but bowing over said balls to transfer increased spring load to said balls with the valve stem in open position thereby to rotatably drive said retainer relative to said collar member, the ratio of the radial distance from the inner edge of said spring washer to the points of contact between said spring washer and said balls to the radial width of said spring washer being at least as great as the ratio of the expected normal spring load to the expected increased spring load.

14. In an assembly including a member having a bore, a shaft slidable in the bore and a compression spring urging the shaft in one direction to a first axial position, the shaft being actuatable against the action of the spring in the opposite direction to a second axial position, a device interposed with the spring between the member and the shaft for rotating the shaft upon reciprocable movement thereof between said first and second positions, said device comprising: a first part, a second part, an annular resilient washer disposed between said first and second parts and having an outer portion contacted with one of said parts and an inner portion contacted with the other of said parts, said first part having a portion provided with circumferentially spaced cam surfaces, and a plurality of shiftable members each engaging one of said cam surfaces and an intermediate point of said resilient washer between said inner and outer portions of the washer, the ratio of the radial distance between the inner portion of said washer contacted with said second part and said intermediate points to the radial distance between said portions of said washer contacted by the first and second parts being at least as great as the ratio of the force applied by the compression spring in said first axial position of the shaft to the force applied by said compression spring in said second axial position of the shaft.

15. A valve rotating device for an assembly including a member with a valve seat and a compression spring loaded poppet valve coacting with said seat between a closed position with a first spring load and an axially displaced open position with a second and increased spring load, said device being interposed with said spring between the member and valve and including first and second parts with a spring washer therebetween having an outer portion engaging one part and an inner portion engaging the other part, said first part having axially inclined runways therein, shiftable elements in said runways engaging an intermediate portion of the washer inwardly from the periphery of the washer, means biasing said elements to the shallow ends of the runways, the ratio of the radial distance between that portion of the washer engaged by the second part and the intermediate portion engaged by the shiftable elements to the radial distance between the portions engaged by the first and second parts being at least as great as the ratio of the first and second compression spring loads, whereby in the open valve position the load on the washer will be transferred from the first part to the shiftable elements so that the second part will be free to rotate the valve under the driving force of the shiftable elements as they move toward the deep ends of the runways.

16. A valve rotating device for a poppet valve and seat assembly including a member having a valve stem guide and a valve seat, a poppet valve having a stem slidable in said guide and a head coacting with said seat, a compression spring surrounding the valve stem and urging the valve head against the seat to a closed position, said stem being actuatable against the action of the spring in the opposite direction to an open valve position spaced from said seat, a device interposed with the spring between the member and the stem for rotating the stem upon reciprocable movement thereof between closed and open valve positions, said device comprising first and second parts with an annular resilient washer disposed therebetween and having an outer peripheral portion engageable with one of said parts and an inner peripheral portion engageable with the other of said parts, said first part having circumferentially spaced axially inclined cam surfaces, and a plurality of ball members each engaging an intermediate portion of said resilient washer between said outer and inner peripheral portions and one of said cam surfaces, means urging said ball members along the said cam surfaces toward said washer, and the ratio of the radial distance between the inner peripheral portion of the washer engaged by said second part and the intermediate portion of the washer engaged by the balls being at least as great as the ratio of the force applied by the compression spring in the closed valve position to the force applied by the compression spring in the open valve position whereby the load at outer peripheral portion of the washer will be transferred from the first part to the balls in the open valve position to insure free and positive rotation of the valve without friction between said washer and first part and without scuffing the balls.

References Cited in the file of this patent

UNITED STATES PATENTS

| Number | Name | Date |
|---|---|---|
| 1,297,342 | Garlick | Mar. 18, 1919 |
| 1,513,075 | Trembley | Oct. 28, 1924 |
| 2,397,502 | Ralston | Apr. 2, 1946 |
| 2,516,795 | Norton | July 25, 1950 |
| 2,582,060 | Newton | Jan. 8, 1952 |